(12) United States Patent
Kishigami et al.

(10) Patent No.: US 7,940,215 B2
(45) Date of Patent: May 10, 2011

(54) ADAPTIVE ANTENNA RADIO COMMUNICATION DEVICE

(75) Inventors: Takaaki Kishigami, Ota-ku (JP); Takashi Fukagawa, Kawasaki (JP); Yasuaki Yuda, Yokohama (JP); Keiji Takakusaki, Yokohama (JP); Shoji Miyamoto, Sendai (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/961,340

(22) Filed: Dec. 20, 2007

(65) Prior Publication Data

US 2008/0107195 A1    May 8, 2008

Related U.S. Application Data

(62) Division of application No. 10/524,253, filed on Feb. 10, 2005, now Pat. No. 7,333,056.

(51) Int. Cl.
  *G01S 5/02* (2010.01)
(52) U.S. Cl. .................. 342/417; 342/368; 342/422
(58) Field of Classification Search .................. 342/417
  See application file for complete search history.

(56) References Cited

U.S. PATENT DOCUMENTS

| | | | |
|---|---|---|---|
| 6,087,986 A * | 7/2000 | Shoki et al. ................ 342/383 |
| 6,115,426 A * | 9/2000 | Fujimoto et al. ............ 375/260 |
| 6,236,363 B1 | 5/2001 | Robbins et al. |
| 6,249,250 B1 * | 6/2001 | Namekata et al. ........... 342/372 |
| 6,278,406 B1 | 8/2001 | Kuwahara |
| 6,717,979 B2 | 4/2004 | Ribeiro Dias et al. |
| 6,876,645 B1 | 4/2005 | Guey et al. |
| 6,879,624 B2 * | 4/2005 | Sano ............................. 375/147 |
| 6,968,169 B2 | 11/2005 | Miyatani |
| 7,088,956 B2 | 8/2006 | Kishigami et al. |
| 7,103,119 B2 * | 9/2006 | Matsuoka et al. ........... 375/347 |
| 7,136,438 B2 | 11/2006 | Doi |
| 7,149,266 B1 | 12/2006 | Imamura et al. |
| 7,751,845 B2 * | 7/2010 | Iwami .......................... 455/522 |
| 2002/0072343 A1 | 6/2002 | Miyatani |
| 2002/0085653 A1 * | 7/2002 | Matsuoka et al. ........... 375/347 |

(Continued)

FOREIGN PATENT DOCUMENTS

JP        11-205026 A    7/1999

(Continued)

OTHER PUBLICATIONS

N. Kikuma, "Array Antenna ni yoru Tekio Shingo Shori (Japan)", Kagaku Gijutsu Shuppan, Nov. 25, 1998, pp. 173-268.

(Continued)

*Primary Examiner* — Thomas G Black
*Assistant Examiner* — Shelley Chen
(74) *Attorney, Agent, or Firm* — RatnerPrestia

(57) ABSTRACT

An adaptive antenna radio communication device comprises a divided band direction estimating unit for estimating the direction by calculating the cross correlations between a pilot signal and sub-carrier signals of the respective divided bands received by an array antenna and calculating a spatial profile from correlation matrices determined by combining the correlation values between antenna elements of the different sub-carriers according to the output of the cross correlation calculation; a divided band array weight creating unit for creating a weight of a receive array having a directional beam in the direction of estimation for each divided band; and a sub-carrier directivity creating unit for creating a directivity by multiplication-combining the created receive array weight with the corresponding sub-carrier signal.

6 Claims, 7 Drawing Sheets

U.S. PATENT DOCUMENTS

| | | |
|---|---|---|
| 2003/0012262 A1 | 1/2003 | Ribeiro Dias et al. |
| 2003/0095573 A1* | 5/2003 | Vook et al. .................... 370/478 |
| 2003/0210670 A1 | 11/2003 | Kisigami et al. |
| 2003/0228887 A1 | 12/2003 | Kishigami et al. |
| 2004/0085946 A1 | 5/2004 | Morita et al. |
| 2005/0250564 A1 | 11/2005 | Kishigami et al. |
| 2007/0263736 A1* | 11/2007 | Yuda et al. .................... 375/260 |

FOREIGN PATENT DOCUMENTS

| | | |
|---|---|---|
| JP | 2002-176384 A | 6/2002 |
| JP | 2002-190759 A | 7/2002 |
| JP | 2002-198878 | 7/2002 |
| JP | 2002-198878 A | 7/2002 |
| JP | 2004-120536 | 4/2004 |
| JP | 2006019820 A | 1/2006 |
| JP | 4309110 B2 | 5/2009 |

OTHER PUBLICATIONS

International Search Report corresponding to Application No. PCT/JP03/12346 dated Jan. 13, 2004.

Vook, et al., "Adaptive Antennas for OFDM," Vehicular Technology Conference, 1998, VTC 98, 48$^{th}$ IEEE, May 21, 1998, vol. 1, pp. 606-610.

Patent Decision for Japanese Patent Application No. 2002-283194 dated Apr. 3, 2009.

Notification of Reasons for Rejection for Japanese Patent Application No. 2002-283194 dated May 7, 2008.

Text of Notification of the First Office Action for Application No. 03819628X from The State Intellectual Property Office of P.R. China, Mar. 7, 2008.

Text of Notification of the Second Office Action for Application No. 03819628X from The State Intellectual Property Office of P.R. China, Sep. 18, 2009.

* cited by examiner

ADAPTIVE ANTENNA RADIO COMMUNICATION DEVICE

This application is a Divisional of U.S. patent application Ser. No. 10/524,253, filed Feb. 10, 2005, which is a U.S. National Phase Application of PCT International Application PCT/JP2003/012346 the entire disclosure of which is incorporated herein by reference.

TECHNICAL FIELD

The present invention relates to an adaptive antenna radio communication device provided with a direction estimating unit of arrival paths and an array antenna having a directivity controlling unit based thereon for a digital radio communication system in a multi-carrier transmission method using a plurality of sub-carriers having different frequencies.

BACKGROUND ART

Signals received by a radio communication device have been interfered by various signals, leading to the deterioration of the reception quality. As a technique to suppress this kind of interference and strongly receive only signals arriving from a desired direction, an adaptive array antenna (adaptive antenna) has been known. The adaptive array antenna can receive only signals arriving from a desired direction by adjusting a weight coefficient by which the receiving signals are multiplied (hereinafter, the weight coefficient is referred to as "weight") to adjust the amplitude and phase given for receiving signals.

Furthermore, demands for the mass radio communication and high speed have been recently increased. To realize such demands, anti-multi-path property and anti-fading countermeasure have been big subjects to be solved. One of approaches to solve the subjects is multi-carrier transmission transmitting in parallel by a plurality of narrowband sub-carriers in a band for performing wideband transmission. In particular, the orthogonal frequency division multiplexing (OFDM) transmission method has been adopted in terrestrial digital broadcasting or wideband radio access systems.

When an adaptive array antenna is used in a multi-carrier transmission system, both can be further characterized, thus enhancing anti-multi-path property and anti-fading property.

Description of detailed configuration will not be described. However, in a multi-carrier transmission system, there has been described a conventional radio device equipped with an adaptive array antenna, for example, in JP-A-1999-205026. Due to this, even when the relative band (the ratio of the entire communication band in use to the center frequency of the entire communication band) was high, a directional beam of an antenna that is uniform at the entire communication bands in the OFDM transmission method can be obtained and transmission/reception that is hard to be influenced by interfering wave such as multi-path and the like in the entire communication band can be made, by calculating a weight of an antenna in the respective sub-carriers.

However, the conventional adaptive antenna radio communication device has a problem in that it was unable to estimate the direction with sufficient accuracy for receiving sub-carriers having low received power, when it was influenced by frequency selective fading for performing the direction estimation for each sub-carrier and calculating a weight of a receive array. Furthermore, it has a problem in that, when the number of sub-carriers was high, the circuit specification has increased.

DISCLOSURE OF THE INVENTION

The present invention estimates the average direction-of-arrival of sub-carrier signals belonging to a divided band to which the communication band is divided, using a sub-carrier signal having high correlation of spatial spectrum among adjacent sub-carrier signals in a wideband multi-carrier transmission method. So, even when sub-carriers having low received power exist, the deterioration estimation degree can be suppressed by estimating the direction-of-arrival as sub-carrier signals including such sub-carriers. Also, individual or average direction of a plurality of paths for the respective sub-carriers can be estimated.

In case of directivity transmission, an angle spread based on a spatial spectrum is detected in the respective divided bands or the entire communication band. When the angle spread is small, a transmission directivity control is performed on the basis of the average direction-of-arrival of the entire sub-carrier signals. On the other hand, when the angle spread is large, a directivity transmission control is performed either 1) in the direction giving the maximum received power among the direction estimation results in the respective divided bands or 2) in the direction giving the upper received power having the predetermined number among the direction estimation results in the respective divided bands. Thus, a directivity transmission can be made in the direction of arrival path upon reception and interference with other users can be effectively reduced, thus enhancing the communication quality and improving the system capacity.

An adaptive antenna radio communication device according to the present invention comprises an array antenna made up of a plurality of antenna elements receiving high frequency signals that are transmitted by multi-carrier; a demultiplexer for demultiplexing the signal received by the respective antenna elements to a plurality of sub-carrier signals; Nd divided band direction estimating units for estimating the direction-of-arrival of a radio wave by dividing the entire communication band being multi-carrier transmitted into Nd bands (however, Nd is 2 or more or a positive integer less than the number of sub-carriers used being multi-carrier transmitted) and using sub-carrier signals belonging to the respective divided bands; a divided band array weight creating unit for creating a weight of a receive array having a directional beam in the direction of estimation by the divided band direction estimating unit for the respective divided bands; a sub-carrier directivity creating unit for creating a directivity by multiplication-combining the receive array weight created in each divided band with the corresponding sub-carrier signal belonging to the divided band; and a demodulating unit for demodulating data by using the output of the sub-carrier directivity creating unit. Accordingly, since the direction-of-arrival of the sub-carrier signals in the divided band can be estimated, a directivity reception can be made on the basis of the direction estimation results.

The divided band direction estimating unit of the adaptive antenna radio communication device according to the present invention also calculates pilot signal correlation values with the respective input sub-carrier signals using a known pilot signal embedded in a sub-carrier signal, and estimates the direction-of-arrival based on the correlation values of said pilot signal correlation values calculated between the same sub-carrier signals received by different antenna elements. Thus, the direction can be estimated on the basis of the phase of the pilot correlation values.

The divided band direction estimating unit of the adaptive antenna radio communication device according to the present invention also estimates the direction-of-arrival using correlation matrices integrating correlation matrices of the respective sub-carriers belonging to the sub-carrier signals.

The divided band direction estimating unit of the adaptive antenna radio communication device according to the present invention also estimates the direction-of-arrival using a correlation matrix R expressed as $R=V_1V_1^H+V_2V_2^H+\ldots+V_LV_L^H$ where L is the number of sub-carriers belonging to the sub-carrier signals; Vk is a column vector having a pilot signal correlation value as an m-th element in the m-th antenna element with respect to the k-th sub-carrier signal; and H is a complex conjugate transposed operator. Accordingly, the average direction of the directions-of-arrival of the sub-carrier signals can be detected with better accuracy.

The divided band direction estimating unit of the adaptive antenna radio communication device according to the present invention also estimates the direction-of-arrival by using a correlation vector integrating correlation vectors of the respective sub-carriers belonging to the sub-carrier signals.

The divided band direction estimating unit of the adaptive antenna radio communication device according to the present invention also estimates the direction-of-arrival using a correlation vector z expressed as $$z = V_{1x}^*V_1 + V_{2x}^*V_2 + \ldots + V_{Lx}^*V_L$$

where L is the number of sub-carriers belonging to the sub-carrier signals; Vk is a column vector having a pilot signal correlation value as an m-th element in the m-th antenna element with respect to the k-th sub-carrier signal; Vkx is an x-th element of the column vector Vk (however, x is a positive integer less than the number of antenna elements); and * is a complex conjugate operator. Thus, the average direction of the directions-of-arrival of the sub-carrier signals can be detected with better accuracy.

The divided band direction estimating unit of the adaptive antenna radio communication device according to the present invention also has a path search unit for calculating a delay profile by calculating a cross correlation between respective input sub-carrier signals using a known pilot signal embedded in the sub-carrier signal and detecting a plurality of path arrival timings from the delay profile, and estimates the direction-of-arrival based on the correlation value of the pilot signal correlation value calculated between the same sub-carrier signals received by different antenna elements in the respective path arrival timings. Thus, the direction-of-arrival of multi-path waves included in the respective sub-carrier signals can be estimated.

The divided band direction estimating unit of the adaptive antenna radio communication device according to the present invention also estimates the direction-of-arrival using a correlation matrix integrating correlation matrices of the respective sub-carriers detected in the respective sub-carriers belonging to the sub-carrier signals.

The divided band direction estimating unit of the adaptive antenna radio communication device according to the present invention also estimates the direction-of-arrival using a correlation matrix R expressed as $$R = \sum_{k=1}^{L} \sum_{p=1}^{S} V_k(p)V_k(p)^H$$

where L is the number of sub-carriers belonging to the sub-carrier signals; Vk(p) is a column vector having the pilot signal correlation values as an m-th element in the m-th antenna element of the p-th arrival path (the number of whole arrival paths is specified as S) with respect to the k-th sub-carrier signal; and H is a complex conjugate transposed operator. Accordingly, the directions of arrival of multi-path waves included in the respective sub-carrier signals can be estimated with better accuracy.

The divided band direction estimating unit of the adaptive antenna radio communication device according to the present invention also estimates the direction-of-arrival using a correlation vector integrating correlation vectors of the respective sub-carriers detected in the respective sub-carriers belonging to the sub-carrier signals.

The divided band direction estimating unit of the adaptive antenna radio communication device according to the present invention also estimates the direction-of-arrival using a correlation vector z expressed as $$z = \sum_{k=1}^{L} \sum_{p=1}^{S} V_{kx}(p) * V_k(p)$$

where L is the number of sub-carriers belonging to the sub-carrier signals; Vk(p) is a column vector having the pilot signal correlation values as an m-th element in the m-th antenna element of the p-th arrival path (the number of whole arrival paths is specified as S) with respect to the k-th sub-carrier signal and * is a complex conjugate operator. Thus, the directions of arrival of multi-path waves included in the respective sub-carrier signals can be estimated with better accuracy.

The divided band direction estimating unit of the adaptive antenna radio communication device according to the present invention also estimates the direction-of-arrival by any one of the MUSIC method, ESPRIT method, CAPON method and Fourier method using the correlation matrix R. Thus, various estimation methods of direction-of-arrival can be applied.

The divided band direction estimating unit of the adaptive antenna radio communication device according to the present invention also has a spatial smoothing processing unit for performing spatial smoothing processing on said correlation matrix R and estimates the direction-of-arrival by using any one of the MUSIC method, ESPRIT method, CAPON method and Fourier method to the output from the spatial smoothing processing unit. Thus, even when correlation waves exist, the accuracy of estimation can be ensured.

The divided band direction estimating unit of the adaptive antenna radio communication device according to the present invention also has a unitary converting unit for performing unitary conversion processing on the correlation matrix R and estimates the direction-of-arrival by using any one of the MUSIC method, ESPRIT method, CAPON method and Fourier method to the output from the unitary converting unit. Thus, when an array antenna is a uniform linear array, a directional vector is put into a real number so that a throughput of operation can be reduced.

Furthermore, an adaptive antenna radio communication device according to the present invention comprises an array antenna made up of a plurality of antenna elements receiving high frequency signals that are transmitted by multi-carrier; a demultiplexer for demultiplexing the signal received by the respective antenna elements to a plurality of sub-carrier signals; an entire band direction estimating unit for estimating the direction-of-arrival using multi-carrier signals in the entire communication band being multi-carrier transmitted; Nd divided band direction estimating units for dividing the entire communication band into Nd bands (however, Nd is 2 or more, or a positive integer less than the number of sub-carriers used being multi-carrier transmitted) and estimating the direction-of-arrival of a radio wave by using sub-carrier signals belonging to the respective divided bands; a direction estimation result selecting unit for selecting and outputting an estimation value of the entire band direction estimating unit when the deviation of the direction estimation results in ND divided band direction estimating units is less than the predetermined value, and for outputting an estimation value of the divided band direction estimating unit when the deviation is greater than the predetermined value; and a divided band array weight creating unit for creating a weight of a receive array having a directional beam in the direction of estimation using the output of the direction estimation result selecting unit. Accordingly, directivity control methods can be adaptively switched from the spread of the direction-of-arrival in a band.

Furthermore, an adaptive antenna radio communication device according to the present invention comprises an array antenna made up of a plurality of antenna elements receiving high frequency signals that are transmitted by multi-carrier; a demultiplexer for demultiplexing the signal received by the respective antenna elements to a plurality of sub-carrier signals; an entire band direction estimating unit for estimating the direction-of-arrival using multi-carrier signals in the entire communication band being multi-carrier transmitted; Nd divided band direction estimating units for estimating the direction-of-arrival of a radio wave by dividing the entire communication band being multi-carrier transmitted into Nd bands (however, Nd is 2 or more, or a positive integer less than the number of sub-carriers used being multi-carrier transmitted) and using sub-carrier signals belonging to the respective divided bands; a direction estimation result selecting unit for detecting an angle spread from the spatial profile calculated in the entire band direction estimating unit, for selecting and outputting an estimation value of the entire band direction estimating unit when the angle spread is less than the predetermined value, or outputting an estimation value of the divided band direction estimating unit when the angle spread is greater than the predetermined value; and a divided band array weight creating unit for creating a weight of a receive array using the output of the direction estimation result selecting unit. Accordingly, directivity control methods can be adaptively switched from the spread of the direction-of-arrival in a band.

Furthermore, the adaptive antenna radio communication device according to the present invention, in a radio system being multi-carrier transmitted in a time division duplex (TDD) method or a frequency division duplex (FDD) method, further comprises a sub-carrier transmission weight creating unit for calculating a weight of a transmission array that forms a transmitting directional beam in the respective divided bands based on the estimated direction result selected by the direction estimation result selecting unit; and a sub-carrier transmission directivity creating unit for transmitting a directional beam being multiplied the transmitting sub-carrier signal by the transmission array weight in the respective divided bands. Accordingly, directivity control methods can be adaptively switched from the spread of the direction-of-arrival in a band.

Furthermore, the adaptive antenna radio communication device according to the present invention, in a radio system being multi-carrier transmitted in a time division duplex (TDD) method, further comprises a sub-carrier transmission weight creating unit using a weight of a receive array created in the divided band array weight creating unit for each divided band as a weight of a transmission array; and a sub-carrier transmission directivity creating unit for transmitting a directional beam using a weight of a transmission array common to the respective divided bands. Thus, the same directivity as a receive directivity in the respective divided bands can be used for transmitting.

Furthermore, the adaptive antenna radio communication device according to the present invention, in a radio system being multi-carrier transmitted in a time division duplex (TDD) method or a frequency division duplex (FDD) method, further comprises a sub-carrier transmission weight creating unit for calculating a weight of a transmission array in order to create a transmitting directional beam in the direction of estimation giving maximum received power among the directions of estimation by all divided band direction estimating units; and a sub-carrier transmission directivity creating unit for transmitting a directional beam common to the entire divided band using the transmission array weight. Thus, a transmitting beam can be formed in the direction of path giving the maximum received power among the divided bands.

Furthermore, the adaptive antenna radio communication device according to the present invention, in a radio system being multi-carrier transmitted in a time division duplex (TDD) method or a frequency division duplex (FDD) method, further comprises a sub-carrier transmission weight creating unit for calculating a deviation of the estimation direction outputted from the divided band direction estimating unit, calculating a weight of a transmission array for creating a transmitting directional beam in the average direction of direction estimation values outputted from all divided band direction estimating units when the deviation is less than the predetermined value, or calculating the transmission array weight in the direction of estimation giving a predetermined number of the upper received power among all divided bands when the deviation is greater than the predetermined value. Thus, directivity control methods can be adaptively switched from the spread of the direction-of-arrival in a band.

Furthermore, in an adaptive antenna radio communication device according to the present invention, sub-carrier signals to which orthogonal frequency division multiplexing (OFDM) is applied are used for multi-carrier transmission. So, multi-carrier can be transmitted in a modulation method having high frequency utilization efficiency.

Furthermore, in an adaptive antenna radio communication device according to the present invention, sub-carrier signals in which users are multiplexed are used for the multi-carrier transmission by code division in the direction of frequency axis or time axis. Thus, the present invention has an action that can be applied to a system in which user multiplexing can be made in accordance with code division.

The adaptive antenna radio communication device according to the present invention also creates a weight of a transmission array or a weight of a receive array for the respective multiplexed users for directional receiving. Thus, an optimum directivity can be controlled in the respective divided bands for the respective multi-users.

The divided band array weight creating unit of the adaptive antenna radio communication device according to the present invention also has a directional beam in the direction estimation result of the divided band direction estimating unit in its divided band and creates a weight of a receive array for creating a null in the estimation direction of other multiplexed users. So, an optimum directivity can be received such that a null is formed in the direction of interference in the respective divided bands for the respective multi-users.

The sub-carrier transmission weight creating unit of the adaptive antenna radio communication device according to the present invention also has a directional beam in the direction of a desired user and creates a weight of a transmission array for creating a null in the direction of other multiplexed users. Thus, an optimum directivity can be transmitted/received such that a null is formed in the direction of interference in the respective divided bands for the respective multi-users.

According to the present invention, as described above, even when an adaptive antenna radio communication device equipped with an array antenna employs a wideband multi-carrier transmission method and sub-carriers having low received power exit, the deterioration of the estimation accuracy can be suppressed and the reception quality can be improved. Furthermore, in case of a directivity transmission, multiuser interference can be reduced and an improvement of the communication quality can be devised.

BEST MODE FOR CARRYING OUT THE INVENTION

Figure 1:
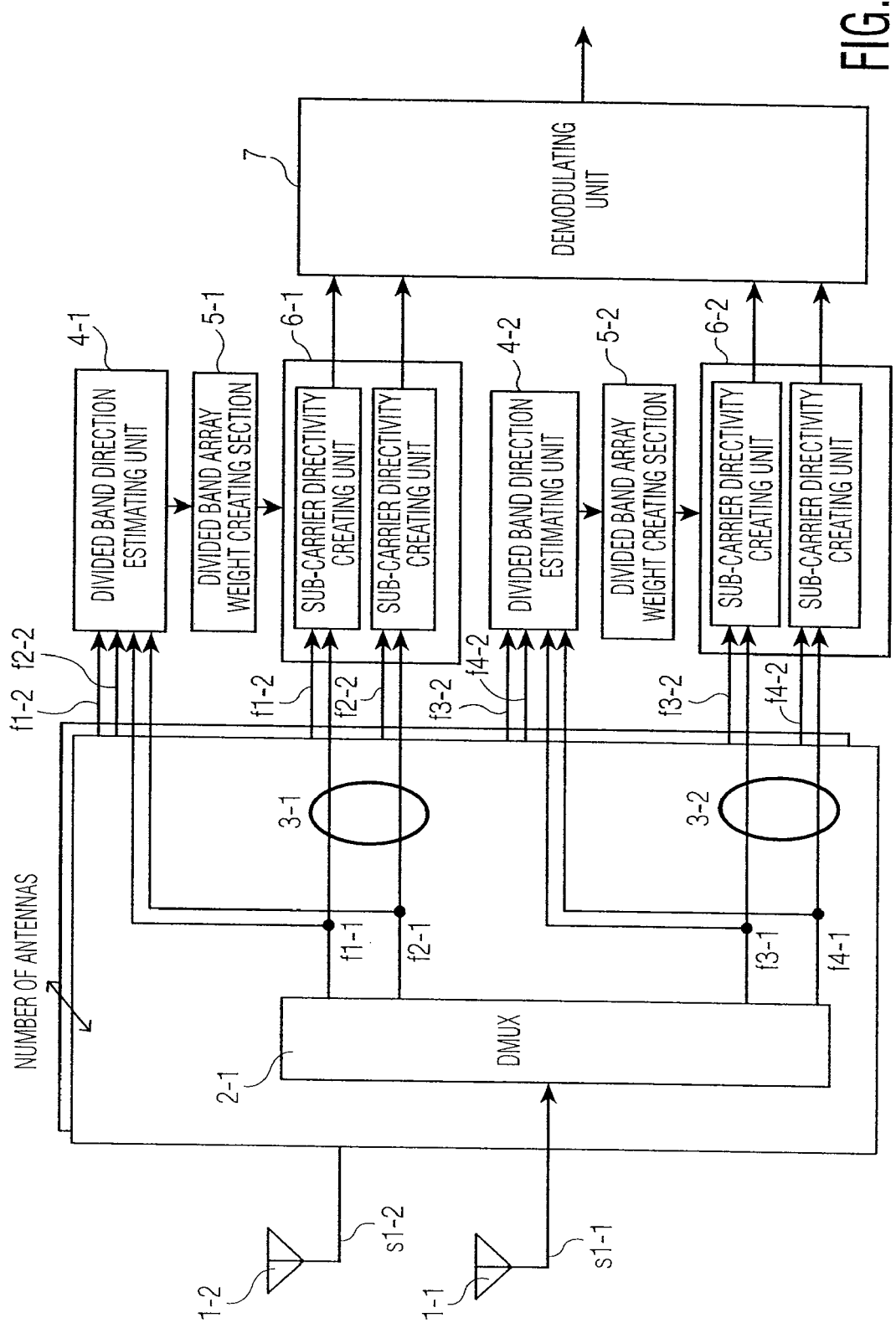
FIG. 1 is a block diagram illustrating a configuration of a radio communication device in a first embodiment of the present invention.

Embodiments of the present invention are demonstrated hereinafter with reference to the drawings. Throughout the drawing, the same blocks when shown in more than one figure are designated by the same reference numerals.

1st Exemplary Embodiment

FIG. 1 is a block diagram illustrating a configuration of an adaptive antenna radio communication device in a first embodiment of the present invention. The adaptive antenna radio communication device illustrated in FIG. 1 comprises an array antenna 1 made up of multiple Na antenna elements 1-1 to 1-Na; a demultiplexer 2-$k$ (however, k is 1 to Na) for demultiplexing a signal s1-$k$ received by a k-th antenna element 1-$k$ to a plurality of Ns sub-carrier signals f1-k to Ns-k after the high frequency signal is frequency-converted; a divided band direction estimating unit 4-$m$ for estimating the direction-of arrival using sub-carrier signals belonging to the m-th divided band 3-$m$ among divided bands in which a communication band is divided into Nd bands; a divided band array weight creating section 5-$m$ for creating a weight of a receive array based on the direction estimation result from the m-th divided band direction estimating unit 4-$m$; a sub-carrier directivity creating unit 6-$m$ for creating a directivity to sub-carrier signals belonging to the m-th divided band 3-$m$ using the receive array weight created in the divided band array weight creating unit 5-$m$; and a demodulating unit 7 for demodulating data using each sub-carrier signal in which a directivity is received. Here, m indicates 1 to Nd. Incidentally, an example of a configuration is illustrated in FIG. 1 when the number of antenna elements Na is 2, the number of sub-carriers Ns is 4, and the number of divided bands Nd is 2.

The operation of the outline is described below with reference to FIG. 1. First, antenna elements 1-1 to 1-Na configuring the antenna element 1 receives high frequency signals s1-$l$ to s1-Na respectively that is transmitted in a multi-carrier method. Of such signals, a high frequency signal s1-$k$ received by the k-th antenna element 1-$k$ performs a high frequency amplification and frequency conversion sequentially in the demultiplexer 2-$k$. A plurality of Ns sub-carrier signals f1-$k$, f2-$k$, . . . , fNs-k are extracted, which are used for multi-carrier transmission. Herein, an entire communication band of a receive signal can be divided into Nd divided bands. Sub-carrier signals belonging to the m-th divided band 3-$m$ therein is input to the divided band direction estimating unit 4-$m$ and the sub-carrier directivity creating unit 6-$m$ respectively. Incidentally, the number of divided bands Nd can be a positive integer within a range of the number of all Ns sub-carriers $\geq$Nd>1. Also, the number of sub-carriers belonging to sub-carrier signals belonging to each divided band 3 needs not to be certainly equal. The number of sub-carriers Nc (=Ns/Nd) is described to be the same below.

Figure 2:
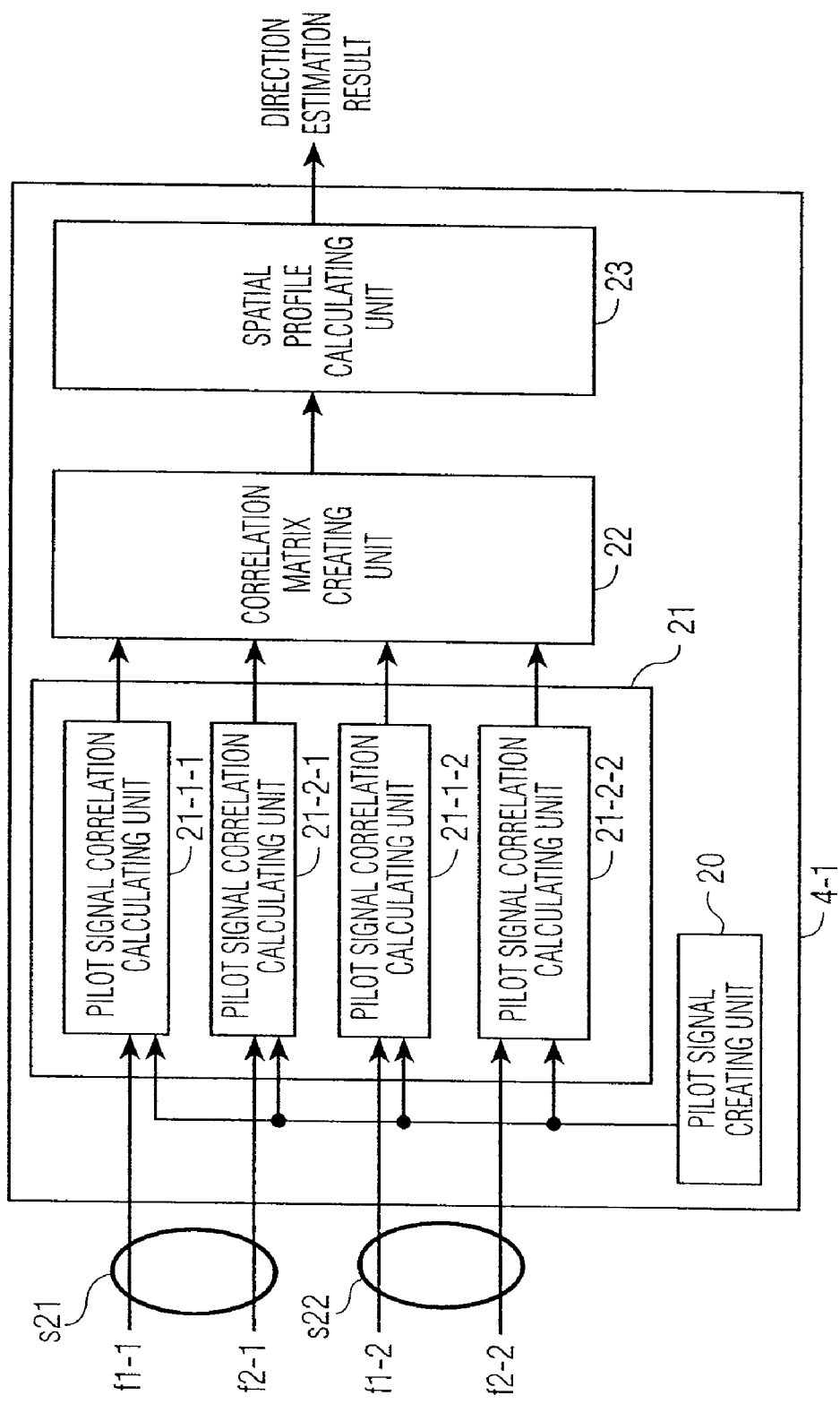
FIG. 2 is a block diagram illustrating a detailed configuration of a divided band direction estimating unit in a first embodiment of the present invention.

Next, using sub-carrier signals belonging to the m-th divided band 3-$m$, the divided band direction estimating unit 4-$m$ conducts estimation of the direction-of-arrival. FIG. 2 illustrates a detailed configuration of the divided band direction estimating unit 4.

In FIG. 2, a divided band direction estimating unit 4-1 is made up of a pilot signal creating unit 20 for creating a pilot signal, i.e., a known pilot signal embedded in each sub-carrier signal; a pilot signal correlation calculating unit 21 for calculating correlation values between each received sub-carrier signal and a created pilot signal; a correlation matrix creating unit 22 for creating a correlation matrix based on pilot signal correlation values; and a spatial profile calculating unit 23 for calculating a spatial profile based on a correlation matrix. Also, sub-carrier signals s21 received by the antenna element 1-1 and sub-carrier signals s22 received by the antenna element 1-2 are input to the different pilot signal correlation calculating unit 21 from the respective sub-carriers. The operation of the outline is described below with reference to FIG. 2. Incidentally, FIG. 2 illustrates an example of the divided band direction estimating unit 4-1 in a first divided band 3-1 when the number of antenna elements Na is 2 and the number of sub-carriers Nc in a divided band is 2.

The pilot signal creating unit 20 creates a known signal (hereinafter referred to as a pilot signal) embedded previously in a sub-carrier signal. The pilot signal correlation calculating unit 21 performs a correlation operation between created pilot signals and receiving pilot symbols of the sub-carrier signals. Herein, a pilot signal is specified as r(s). However, s is 1 to Np where Np is the number of pilot signal symbols.

A pilot signal correlation calculating unit 21-$n$-$k$ performs a correlation operation shown in the formula 1 for the n-th sub-carrier signal fn-k (t0) (incidentally, t0 represents a path arrival timing) belonging to the m-th divided band 3-$m$ received by the k-th antenna element 1-$k$. However, No is the number of over-samples for a symbol and * indicates a complex conjugate. The pilot correlation value h nk is calculated for sub-carrier signals (n=1~Nc) belonging to the m-th divided band 3-$m$ received by all antenna elements (k=1~Na).

$$h_{nk} = \sum_{s=1}^{N_p} f_{n-k}(t + N_0 \cdot (s-1)) r^*(s) \quad (1)$$

The correlation matrix creating unit 22 calculates a correlation matrix R shown in the formula 3 using the pilot correlation value h nk calculated in the pilot signal correlation calculating unit 21 and a correlation vector Vn shown in the formula 2. However, n is 1 to Ns, k is 1 to Na and T is a vector transpose.

$$V_n = [\,h_{n,1} \quad h_{n,2} \quad \ldots \quad h_{n,Na}\,]^T \quad (2)$$

$$R = \sum_{n=1}^{Nc} V_n V_n^H \quad (3)$$

The spatial profile calculating unit 23 performs the direction estimation using a correlation matrix R created in the correlation matrix creating unit 22. Many direction estimation algorithms have been proposed. However, below is described a case where an algorithm for creating a spatial profile based on the Fourier method and detecting its peak direction for finding a direction-of-arrival estimation value is applied.

The spatial profile calculating unit 23 calculates a spatial profile by varying a parameter (of a direction-of-arrival estimation evaluation function F(( ) shown in the formula 4 in a predetermined angle step Δ(. So it detects the peak direction having the predetermined number M (M☐ EMBED Equation. 3 ☐☐☐1) in the descending order of the peak level of a spatial profile and specifies it as a direction-of-arrival estimation value. However, a(( ) is a directional vector that depends on the element arrangement of the array antenna 1. For example, it can be expressed as the formula 5 for a uniform linear array having an element space d. Herein, ( is a wavelength of a center frequency in the divided band 3-*m* in a carrier band, and ( specifies the normal direction of the linear array as the direction of 0(. Furthermore, H is a complex conjugate transpose.

$$F(\theta) = a(\theta)^H R a(\theta) \quad (4)$$

$$a(\theta) = \begin{bmatrix} 1 \\ \exp\{-j2\pi d \cdot 1 \cdot \sin\theta/\lambda\} \\ \vdots \\ \exp\{-j2\pi d \cdot (Na-1) \cdot \sin\theta/\lambda\} \end{bmatrix} \quad (5)$$

Figure 3A:
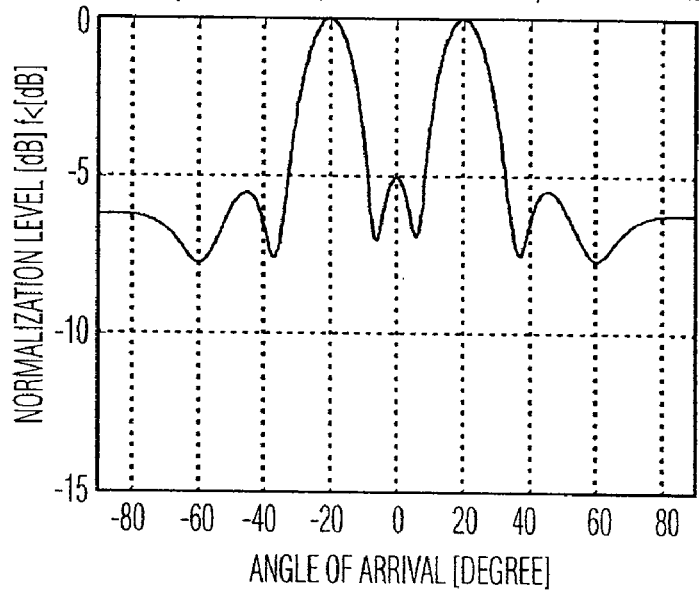
FIG. 3 is a diagram illustrating the spatial profile calculation results from a divided band direction estimating unit in a first embodiment of the present invention.
Figure 3B:
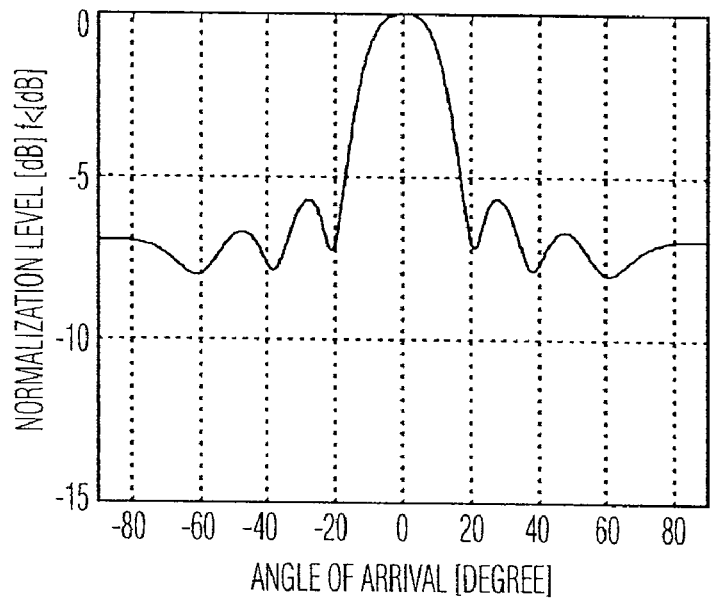

FIG. 3 shows the spatial profile calculation result when the number of array elements Na is 8 and the number of sub-carriers Nc of sub-carrier signals is 2. FIG. 3A is the result when the angle of arrival of a sub-carrier 1 θ1 is 20° and that of a sub-carrier 2 θ2 is −20°, while FIG. 3B is the result when the angle of arrival of the sub-carrier 1 θ1 is 5° and that of the sub-carrier 2 θ2 is −5°. As illustrated in FIG. 3A, a beam former method is used for the direction-of-arrival estimation shown in the formula 4. When the arrival path intervals are separated more sufficiently than the beam width of the array antenna 1, the peak for each path direction can be detected. Furthermore, as shown in FIG. 3B, a plurality of angles of arrival of paths are close to one after another, a spatial profile having the smaller number of peaks than the number of paths is obtained. The peak direction in this case is steering the direction in which the composite power of multiple paths is maximized.

Then, the divided band array weight creating unit 5-*m* creates a weight of a receive array facing toward the main beam in the maximum peak direction of the direction estimation result in the divided band direction estimating unit 4-*m* or in the multiple peak directions of the predetermined number for sub-carrier signals belonging to the m-th divided band 3-*m*.

Next, the sub-carrier directivity creating unit 6-*m* multiplication-combines commonly each sub-carrier signal by the created receive array weight and outputs it to the demodulating unit 7. Incidentally, the receive array weight is created in consideration of a wavelength λm of a center frequency of each divided band 3-*m* in a radio frequency band. This is effective particularly when the relative band is high. For example, the receive array weight Wm in the m-th divided band 3-*m* can be expressed as the formula 6 for a uniform linear array having an element space d. Herein, θ0 is the direction estimation result. Incidentally, the normal direction of the linear array is specified as the direction of 0°.

$$W_m = \begin{bmatrix} 1 \\ \exp\{j2\pi d \cdot 1 \cdot \sin\theta_0/\lambda_m\} \\ \vdots \\ \exp\{-j2\pi d \cdot (Na-1) \cdot \sin\theta_0/\lambda_m\} \end{bmatrix} \quad (6)$$

Next, the demodulating unit 7 performs a demodulation operation using each sub-carrier signal in which a directivity is received from the sub-carrier directivity creating unit 6 via all divided band 3.

In this embodiment, a correlation vector Vn is obtained from each sub-carrier signal belonging to sub-carrier signals belonging to the divided band 3, which is then synthesized to create a correlation matrix R. By performing a direction-of-arrival estimation using the correlation matrix, the average direction-of-arrival of sub-carrier signals in a divided band can be estimated. Accordingly, when the frequency intervals between sub-carrier signals are sufficiently narrow, spatial correlation characteristics between adjacent sub-carrier signals become relatively high. For this reason, even if a received power adjacent to the sub-carrier signal is low, the accuracy of direction-of-arrival estimation can be ensured by performing the direction estimation after combining a plurality of the sub-carrier signals. When the frequency intervals between sub-carrier signals are sufficiently large, the accuracy of direction estimation can be stabilized due to the frequency diversity effect.

Incidentally, the correlation matrix creating unit 22 may employ the correlation vector z shown in the formula 7 as well as the correlation matrix R shown in the formula 3. In this case, the spatial profile calculating unit 23 obtains direction-of-arrival estimation values by calculating the spatial profile shown in the formula 8 as well as in the formula 4 for detecting a peak level. However, Vn,m represents the m-th element of the correlation vector Vn.

$$z = \sum_{n=1}^{Nc} V_{n,1} * V_n \quad (7)$$

$$F(\theta) = |z^H a(\theta)|^2 \quad (8)$$

Incidentally, when each sub-carrier signal is transmitted using a multi-carrier direct sequence code division multiple access (MC/DS-CDMA) method to be spread in the direction of time axis, the divided band direction estimating unit 4 may be configured such that it takes out multi-path signals in which the arrival time is different in a sub-carrier signal and performs the direction estimation of the multiple paths. An example of such configurations is illustrated in FIG. 4.

Figure 4:
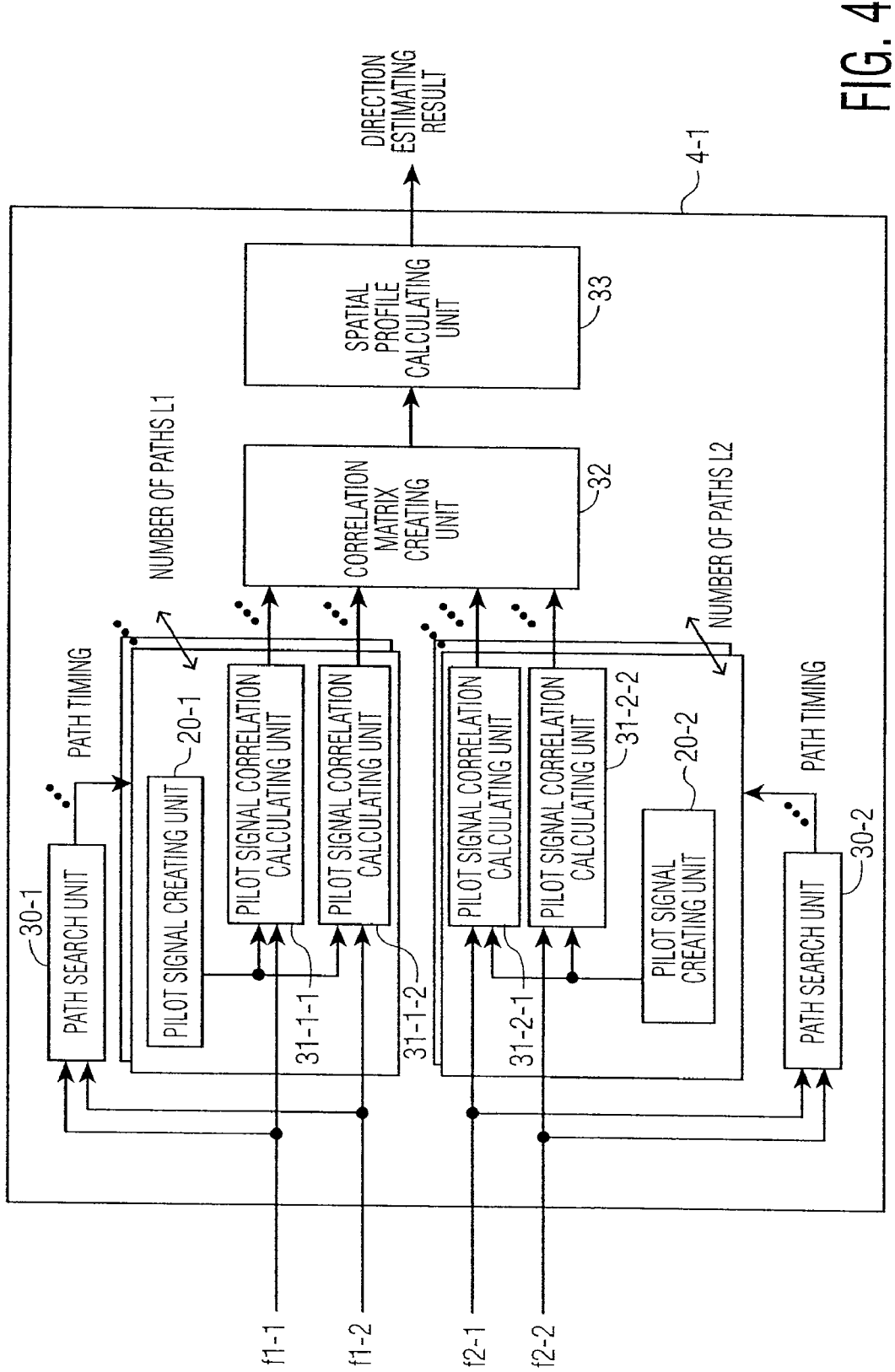
FIG. 4 is a block diagram illustrating another configuration of a divided band direction estimating unit in a first embodiment of the present invention.

FIG. 4 is a diagram illustrating a different configuration of the divided band direction estimating unit 4-1. In FIG. 4, the divided band direction estimating unit 4*b* is made up of a pilot signal creating unit 20 for creating a known pilot signal embedded in each sub-carrier signal; a path search unit 30 for detecting a plurality of arrival path timings in each sub-carrier signal; a pilot signal correlation calculating unit 31 for calculating cross correlation values between a sub-carrier signals received by each of the detected multiple arrival path timings and a created pilot signal; a correlation matrix creating unit 32 for creating a correlation matrix based on the pilot signal correlation values; and a spatial profile calculating unit 33 for calculating a spatial profile that is spatial using the created correlation matrix. The operation of the outline is described below with reference to FIG. 4. Incidentally, FIG. 4 shows an example when the number of antenna elements Na is 2 and the number of sub-carriers Nc in the divided band is 2.

First, path search units 30-1 to 30-Ns create delay profiles using pilot signals embedded in sub-carrier signals and detect a peak timing of the upper received power as a path timing. Herein, the number of receiving path timings detected for the n-th sub-carrier signal of certain sub-carrier signals in a path search unit 30-*n* is specified as Ln. However, n is 1 to Nc. A pilot signal correlation value h nk(tj) in the j-th path timing tj for the n-th sub-carrier signal fn-k received by the k-th antenna element 1-*k* can be expressed as the formula 9. Herein, the pilot signal is specified as r(s). However, s is 1 to Np where Np is the number of symbols of the pilot signal.

$$h_{nk}(t_j) = \sum_{s=1}^{Np} f_{n-k}(t_j + No \cdot (s-1)) r^*(s) \quad (9)$$

Incidentally, the delay profile is created using a method of 1) composing the absolute value or square of the pilot signal correlation value h nk(tj) obtained by each of the antenna elements 1-1 to 1-N for each of the same timings or 2) creating multiple delay profiles by multiplying the pilot correlation value h nk(tj) of the same timing by the weight on which a directional beam is formed, then adding both and obtaining the absolute value or square, and moreover synthesizing them. Also, the delay profile can suppress the noise component by equalizing between a plurality of frames.

Next, the correlation matrix creating unit 32 calculates a correlation matrix R shown in the formula 11 using the pilot correlation value h nk(tj) calculated in the pilot signal correlation calculating unit 31 and the correlation vector Vn(tj) shown in the formula 10. However, n is 1 to Ns, k is 1 to Na and H is a vector complex conjugate transpose.

$$V_n(t_j) = [h_{n,1}(t_j) \quad h_{n,2}(t_j) \quad \ldots \quad h_{n,Na}(t_j)]^T \quad (10)$$

$$R = \sum_{n=1}^{Ns} \sum_{j=1}^{Ln} V_n(t_j) \cdot V_n(t_j)^H \quad (11)$$

Next, the spatial profile calculating unit 33 calculates the spatial profile shown in the formula 4 to perform the direction estimation using the correlation matrix R created by the correlation matrix creating unit 32.

Incidentally, the correlation matrix creating unit 32 synthesizes the correlation vector Vn(tj) and then calculates the spatial spectrum. However, the correlation matrix creating unit may calculate the spatial profile for each path as shown in the formula 12 using the correlation vector Vn(tj) of each path. Incidentally, the formula 12 illustrates a direction estimation evaluation function of the j-th pass for the n-th sub-carrier signal. However, n is 1 to Ns and j is 1 to Ln.

$$F_{nj}(\theta) = |a^H(\theta) V_n(t_j)|^2 \quad (12)$$

Incidentally, the correlation matrix creating unit 32 may employ the correlation vector z shown in the formula 13 as well as the correlation matrix R shown in the formula 11. In this case, the spatial profile calculating unit 32 obtains the direction-of-arrival estimation values by calculating the spatial profile shown in the formula 14 as well as in the formula 4 for detecting a peak level. Herein, Vn,m(tj) represents the m-th element of the correlation vector Vn(tj).

$$z = \sum_{n=1}^{Ns} \sum_{j=1}^{Ln} V_{n,1}^*(t_j) \cdot V_n(t_j) \quad (13)$$

$$F(\theta) = |z^H a(\theta)|^2 \quad (14)$$

Incidentally, in this embodiment, the divided band direction estimating unit 4 performs the direction estimation using the beam former method. Eigenvalue analysis methods, such as the MUSIC method and ESPRIT method whose information is disclosed in "Adaptive Signal Processing by Array Antenna" (Science Press, Inc.) by Kikuma and a high resolution method of a direction-of-arrival estimation such as the Capon Method including the inverse matrix operation of a correlation matrix, can apply to the correlation matrix R of the output of the correlation matrix creating unit 22 or the correlation matrix creating unit 32 shown in the formula 3 or the formula 11. When the number of sub-carrier signals Nc belonging to sub-carrier signals is smaller than the number of array elements, however, since the case can be considered where the number of ranks of the correlation matrix R that is the output of the correlation matrix creating unit 22 does not reach the full rank, a direction estimation algorithm needs to be properly selected in accordance with the number of sub-carriers Nc. Or when the correlation matrix creating unit 32 is used, such an algorithm needs to be selected in accordance with the number that the number of sub-carrier signals Nc and the number of paths Ln are added. Furthermore, when the configuration of the array antenna 1 is uniform linear array arrangement, the arrival direction estimation processing in a beam space in which a directional vector is put into a real number can be applied by multiplying the correlation matrix R obtained in the correlation matrix creating unit 22 or the correlation matrix creating unit 32 by spatial smoothing processing or unitary conversion processing for multiplying the unitary conversion matrix.

Incidentally, sub-carrier transmission may be sub-carrier signals to which the orthogonal frequency division multiplexing (OFDM) is applied. In this case, frequency in which each sub-carrier signal is orthogonal in the OFDM symbol section is selected and used. Also, sub-carrier transmission can be applied to the code division multiplexed MC-CDMA method in the direction of the frequency axis. In this case, the same effect can be obtained by performing the operation explained in this embodiment through the calculation of the pilot correlation value of each sub-carrier signal for each user using the pilot signal embedded in the multiplexed sub-carrier signal for each individual user.

Multi-carrier transmission can also be applied to the code division multiplexed MC/DS-CDMA method in the direction of time axis in the same manner. In this case, the same effect can be obtained by performing the operation explained in this embodiment through the calculation of the pilot correlation value of each sub-carrier signal for each user after extracting a code division multiplexed user signal in the direction of time axis of each sub-carrier signal by de-spreading.

Furthermore, when code division multiplexed users exist, the divided band array weight creating unit 5 may be additionally given a beam creating function for reducing interference between users who are code division multiplexed. This function can be realized by creating a weight of a receive array that has the main beam in the estimation direction of the divided band direction estimating unit 4 in each sub-carrier signals in the direction of a desired user and forms a null in the direction of other multiplexed users.

2nd Exemplary Embodiment

Figure 5:
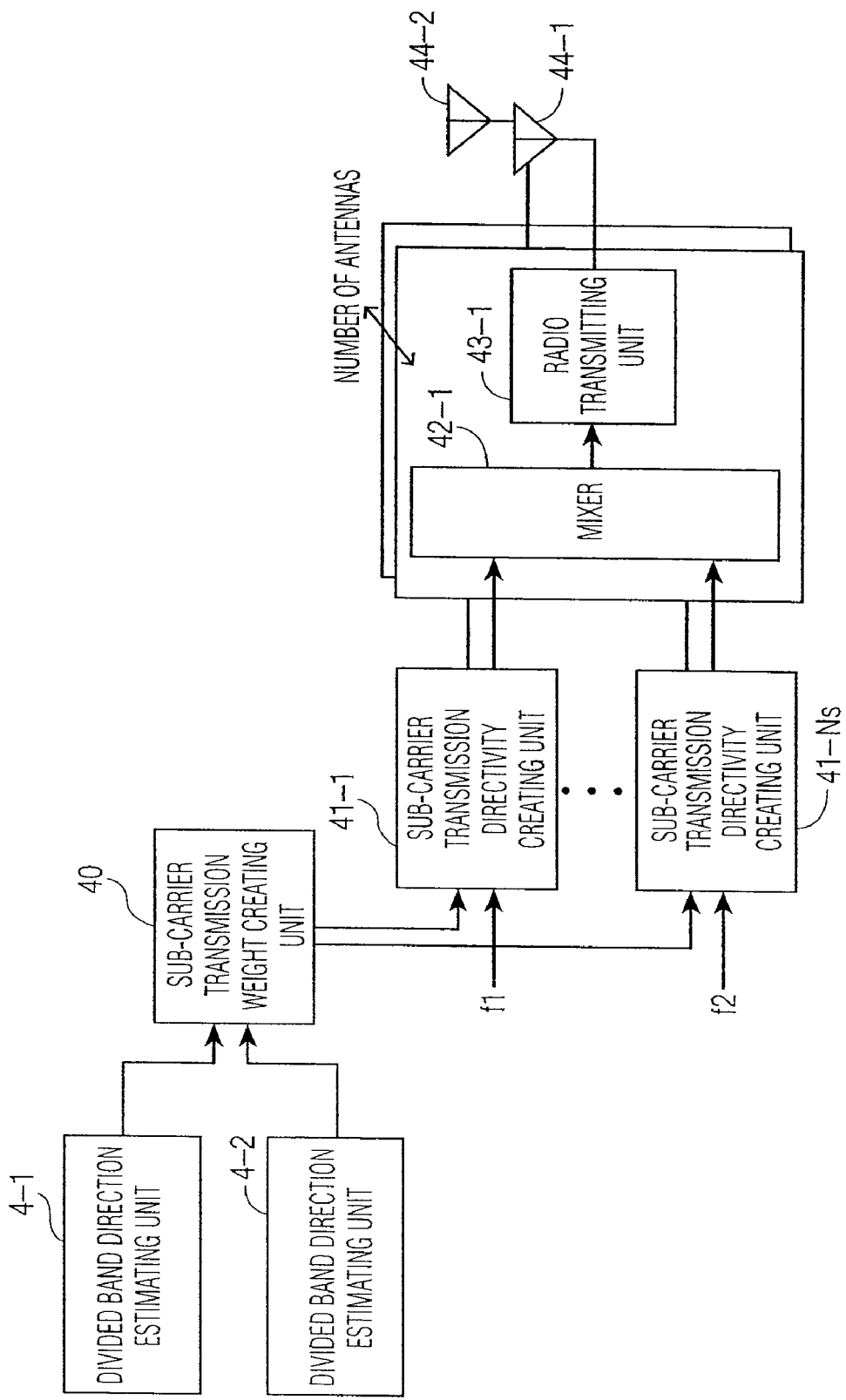
FIG. 5 is a block diagram illustrating a configuration of a radio communication device in a second embodiment of the present invention.

FIG. 5 is a block diagram illustrating a configuration of a transmitting unit of an adaptive antenna radio communication device according to Embodiment 2 of the present invention. According to the configuration of this embodiment, the operation in the configuration of FIG. 1 explained in Embodiment 1 is performed for creating a transmission directivity in each sub-carrier based on the direction estimation result by each divided band direction estimating unit 4. Incidentally, since a block diagram until the direction estimation result of the divided band direction estimating unit 4 is obtained is the same as that of Embodiment 1, the description is omitted here. In FIG. 5, an adaptive antenna radio communication device is made up of a sub-carrier transmission weight creating unit 40 for creating a weight of a transmission array based on the estimation result of the divided band direction estimating unit 4; a sub-carrier transmission directivity creating unit 41 for multiplying each signal in which transmitting sub-carrier signals (f1 to fNs) are reproduced as much as the number of transmission array elements by a weight of a transmission array; a mixer 42 for mixing the weighted sub-carrier signals; a radio transmitting unit 43 for frequency-converting the output of the mixer 42 to the radio frequency. Incidentally, an example of a configuration is illustrated in FIG. 5 when the number of antenna elements Na is 2, the number of sub-carriers Ns is 2 and the number of divided bands Nd is 2. The operation of the outline is described below with reference to FIG. 5.

The operation until the divided band direction estimating units 4-1 to 4-Nd estimate the direction-of-arrival in each divided band based on the high frequency signal so that is transmitted in the multi-carrier mode received by the array antenna 1 is the same as that of Embodiment 1, the description is omitted here.

Next, the sub-carrier transmission weight creating unit 40 creates a weight of a transmission array based on the estimation results from Nd divided band direction estimating units 4. Creation of a transmission array weight operates differently according to a duplex system of a radio communication system. For example, the operation is different according to a time division duplex (TDD) method or a frequency division duplex (FDD) method as described below.

In case of a TDD method, since transmit band and receive band are shared by time division, a weight of a receive array created by each of the divided band array weight creating units 5-1 to 5-Nd is used as a weight of a transmission array Ws based on the estimation direction results of the divided band direction estimating units 4-1 to 4-Nd of each divided band. Also, when the spread (deviation) of the direction estimation results of the divided band direction estimating units 4-1 to 4-N in each divided band over the entire communication band is large, in a radio communication system in which a plurality of users exist according to the code division multiplexing, there is a problem in that multiuser interference becomes larger. For this reason, any of the following operations is applied.

1) The divided band array weight creating units 5-1 to 5-Nd create the transmission weight array Ws for creating a transmitting directional beam in the direction of estimation (maximum peak direction of spatial profiles calculated respectively in the divided band direction estimating units 4-1 to 4-Nd for each divided band) giving the maximum received power among the entire divided bands from the estimation direction results of the divided band direction estimating units 4-1 to 4-Nd for each divided band.

2) The divided band array weight creating units 5-1 to 5-Nd calculate the deviation of the estimation direction in the entire communication band from the estimation direction results from the divided band direction estimating units 4-1 to 4-Nd for each divided band. When the deviation is smaller than the predetermined value, the divided band array weight creating units 5-1 to 5-Nd create the transmission array weight Ws facing toward the multiple main beams in the average direction of each estimation direction result of the divided band direction estimating units 4-1 to Nd for each divided band. Furthermore, when the deviation is higher than the predetermined value, the divided band array weight creating units 5-1 to 5-Nd create it in the estimation direction (upper peak direction of spatial profiles calculated respectively in the divided band direction estimating units 4-1 to 4-Nd for each divided band) of upper received power among the entire divided bands.

In case of a FDD method, transmit band and receive band are different. However, any of the following operations is applied on the basis of the estimation values from each of the divided band direction estimating units 4-1 to 4-Nd.

1) The divided band array weight creating units 5-1 to 5-Nd create the transmission weight array Ws for creating a transmitting directional beam in the direction of estimation (maximum peak direction of spatial profiles calculated respectively in the divided band direction estimating units 4-1 to 4-Nd for each divided band) giving the maximum received power among the entire divided bands from the estimation direction results of the divided band direction estimating units 4-1 to 4-Nd for each divided band.

2) The divided band array weight creating units 5-1 to 5-Nd calculate the deviation of the estimation direction in the entire communication band from the estimation direction results from the divided band direction estimating units 4-1 to 4-Nd for each divided band. When the deviation is smaller than the predetermined value, the divided band array weight creating units 5-1 to 5-Nd create the transmission array weight Ws facing toward the multiple main beams in the average direction of each estimation direction result of the divided band direction estimating units 4-1 to Nd for each divided band. Furthermore, when the deviation is higher than the predetermined value, the divided band array weight creating units 5-1 to 5-Nd create it in the estimation direction (upper peak direction of spatial profiles calculated respectively in the divided band direction estimating units 4-1 to 4-Nd for each divided band) of upper received power among the entire divided bands.

Next, transmitting data is modulated at a modulator that is not illustrated in a predetermined modulation format and transmitting sub-carrier signals 41-1 to Ns are created. The sub-carrier transmission directivity creating unit 41-1 to 41-Ns divides the transmitting sub-carrier signals 41-1 to 41-Ns to the number equal to the number of elements in the array antenna 1 Na for multiplying each of them by elements in the transmission array weight Ws=[w1, w2, . . . , wna] created in the sub-carrier transmission weight creating unit 40, and outputs them to the mixers 42-1 to 42-Na.

The mixers 42-1 to 42-Na mix output signals corresponding to the number of array elements in the directivity-weighted sub-carrier transmission directivity creating units 41-1 to 41-Ns such that sub-carrier signals are arranged at assigned frequency intervals respectively. The radio transmitting units 43-1 to 43-Na transmit outputs of the mixers 42-1 to 42-Na at each radio frequency from the antenna elements 44-1 to 44-Na configuring the frequency-converted array antenna 44.

As described above, according to this embodiment, in addition to the effect of Embodiment 1, as a directivity is transmitted in the estimation directions of the divided band direction estimating units 4-1 to 4-Nd, multi-path interference can be reduced and communication quality can be improved. Also, by restricting the direction of estimation giving the maximum received power among all divided bands or the directivity transmitting direction in the direction having higher received power among divided bands according to the deviation of the direction estimation values of each divided band in the entire communication band, a directivity can be transmitted with better efficiency such that multiuser interference is suppressed. Thus, multiuser interference can be suppressed and the system capacity can be improved.

Incidentally, sub-carrier transmission which can be used for sending may be sub-carrier signals to which orthogonal frequency division multiplexing (OFDM) is applied. In this case, frequency in which each sub-carrier signal is orthogonal in the OFDM symbol section is selected and used. Sub-carrier transmission can also be applied to the code division multiplexed MC-CDMA method in the direction of the frequency axis and each user can obtain the same effect by performing the operation explained in this embodiment. Also, it can be adapted to the code division multiplexed MC/DS-CDMA method in the direction of the time axis in the same manner. In this case, each user can obtain the same effect by performing the operation explained in this embodiment, too.

Furthermore, when code division multiplexed users exist, the sub-carrier transmission weight creating unit 40 may be additionally given a beam creating function for reducing interference between users who are code division multiplexed in the same manner as in Embodiment 1.

3rd Exemplary Embodiment

Figure 6:
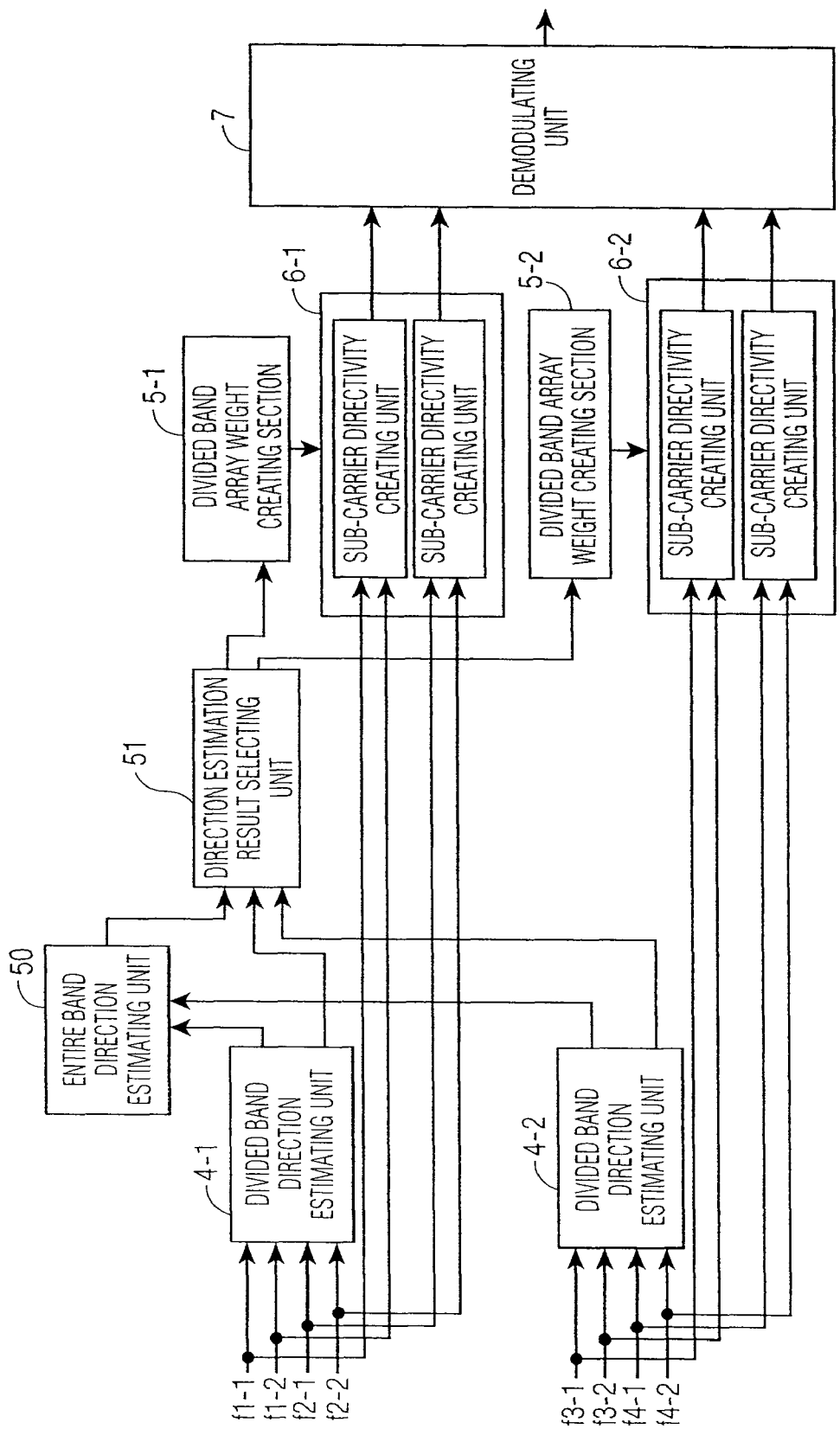
FIG. 6 is a block diagram illustrating a configuration of a radio communication device in a third embodiment of the present invention.

FIG. 6 is a block diagram illustrating a configuration of the receiving unit of an adaptive antenna radio communication device according to Embodiment 3 of the present invention. The configuration of the present embodiment, in the configuration of FIG. 1 explained in Embodiment 1, further comprises an entire band direction estimating unit 50 for estimating the direction in the entire communication band and a direction estimation result selecting unit 51 by using all sub-carrier signals receiving by the array antenna 1. The direction estimation result selecting unit 51 detects an angle spread by using a spatial profile to be calculated in the entire band direction estimating unit 50, selects and outputs the direction estimation result from either of the entire band direction estimating unit 50 or the divided band direction estimating unit 4. Incidentally, since a block diagram until the direction estimation result of the divided band direction estimating unit 4 is obtained is the same as that of Embodiment 1, the description is omitted here. The part that is different from Embodiment 1 is mainly described below with reference to FIG. 6. Incidentally, FIG. 6 illustrates an example when the number of antenna elements Na is 2, the number of sub-carriers Ns is 2 and the number of divided bands Nd is 2.

The operation until the divided band direction estimating units 4-1 to 4-Nd estimate the direction-of-arrival in each divided band based on the high frequency signal so that is transmitted in the multi-carrier mode received by the array antenna 1 is the same as Embodiment 1, the description is omitted here.

The entire band direction estimating unit 50 is to input therein Rn calculated in all divided bands 3-1 to 3-Nd when the correlation matrix R shown in the formula 3 calculated in the n-th divided band 3-$n$ is specified as Rn (however, n is 1 to Nd) and calculates a composite summation Ra of the correlation matrix Rn shown in the formula 15. For example, a spatial profile according to the Fourier method shown in the formula 16 is calculated by varying θ in a predetermined angle step Δθ and the peak direction having the predetermined number M (M□1) in the descending order of the peak level of a spatial profile is detected and then average direction-of-arrival estimation of sub-carrier signals in the entire communication band is performed. However, a(θ) is a directional vector that depends on the element arrangement of the array antenna 1. For example, it can be expressed as the formula 5 for an uniform linear array having an element space d. Herein, λ is a wavelength of a carrier band, and θ specifies the normal direction of the array as the direction of 0°. Furthermore, H is a complex conjugate transpose.

$$R_a = \sum_{n=1}^{Nd} R_n \quad (15)$$

$$F(\theta) = a(\theta)^H R_a a(\theta) \quad (16)$$

Next, the direction estimation result selecting unit 51 calculates an angle spread AS using the direction estimation value φkm of all divided band direction estimating units 4-1 to 4-Nd and spatial profile value (or the direction-of-arrival estimation evaluation function value) Fm(φkm) in each of divided bands 3-$m$ by applying the formula shown in the formula 17. Herein, m represents 1 to Nd. Also, φ0 is given by the formula 18, and φkm indicates the direction-of-arrival of the k-th path among the total Lm paths detected by the divided band direction estimating unit 4-$m$ in the m-th divided band 3-$m$. When the angle spread As is less than the predetermined value K, the direction estimation result selecting unit 51 selects the estimation values of the entire band direction estimating unit 50 using the angle spread As calculated and outputs them to all divided band array weight creating units 5-1 to 5-Nd in common. On the other hand, when the angle spread AS is greater than the predetermined value K, the direction estimation result selecting unit 51 outputs the estimation value of the divided band direction estimating unit 4-$m$ in the m-th divided band 3-$m$ to the divided band array weight creating unit 5-$m$ in the same manner as in Embodiment 1. Herein, m represents 1 to Nd.

Furthermore, as a different method for calculating the angle spread AS, the angle spread AS may be obtained from the formula 17 using only the direction estimation value φkm giving the upper spatial profile value (or the direction-of-arrival estimation evaluation function value) Fm(φkm).

$$AS = \sqrt{\frac{\sum_{m=1}^{Nd} \sum_{k=1}^{Lm} (\phi_{km} - \phi_0)^2 F_m(\phi_{km})}{\sum_{m=1}^{Nd} \sum_{k=1}^{Lm} F_m(\phi_{km})}} \quad (17)$$

$$\phi_0 = \frac{\sum_{m=1}^{Nd} \sum_{k=1}^{Lm} \phi_{km} F_m(\phi_{km})}{\sum_{m=1}^{Nd} \sum_{k=1}^{Lm} F_m(\phi_{km})} \quad (18)$$

Then, the divided band array weight creating unit 5 creates a weight of a receive array facing toward the main beam direction in a particular direction according to the selected direction estimation result by the direction estimation result selecting unit 51, and outputs it to the sub-carrier directivity creating unit 6. The sub-carrier directivity creating unit 6 outputs signals by multiplication-combining commonly each sub-carrier signal by the created receive array weight. Namely, the divided band array weight creating unit 5-*m* in the m-th divided band 3-*m* creates a weight of a receive array facing toward the main beam direction in a particular direction for sub-carrier signals belonging to them-th divided band 4-*m*, according to the selected direction estimation result by the direction estimation result selecting unit 51. The sub-carrier directivity creating unit 6-*m* outputs signals by multiplication-combining commonly each sub-carrier signal by the created receive array weight. This operation is performed for all m, i.e., from 1 to Nd.

The demodulating unit 7 receives data, performing demodulation operation using each sub-carrier signal in which a directivity is received.

As described above, according to this embodiment, in addition to the effect of Embodiment 1, since the direction estimation result selecting unit 51 detects an angle spread of a sub-carrier signal in the entire communication band, directivity formation different with the respective entire divided bands or directivity formation common to all divided bands 3 can be switched in accordance with the angle spread AS. Thus, when the angle spread AS is small, the average direction-of-arrival for all sub-carrier signals can be estimated. For this reason, by frequency selective fading, even when the receiving level of some bands is small, robust direction-of-arrival estimation can be made in the whole communication band.

Incidentally, detection of an angle spread by the direction estimation result selecting unit 51 is calculated on the basis of the spread of the direction-of-arrival estimation value in each divided band. However, the angle spread is also detected by applying a method based on a spatial profile to be calculated in the entire band direction estimating unit 50. As a method for calculating an angle spread from the spatial profile, information is described, for example, in "Concurrent Estimation of Direction-of-Arrival and Angle Spread using MUSIC Algorithm" by N. S. M. Shah et al., 2000 IEICE (The Institute of Electronics, Information and Communication Engineers) Communication Society Conference, B-1-31. By obtaining a spatial profile from the correlation matrix Ra calculated in the formula 15 and using the angle spread AS calculated form the spatial profile, as described above, the estimation results from the entire band direction estimating unit 50 or divided band direction estimating units 4-1 to 4-Nd can be selectively switched.

Incidentally, in this embodiment, the entire band direction estimating unit 50 performs the direction estimation using sub-carrier signals of the entire communication band. In addition, a configuration to perform the direction estimation with the number of divisions greater than the number of sub-carrier signal divisions Ns used by the divided band direction estimating unit 4 may be good.

Incidentally, the entire divided band direction estimating unit 50 in this embodiment performs the direction estimation using the beam former method. Eigenvalue analysis methods, such as the MUSIC and ESPRIT methods whose information is disclosed in "Adaptive Signal Processing in Array Antennas" (Kikuma, Science Press, Inc.) and a high resolution method of a direction-of-arrival estimation, such as the Capon Method including the inverse matrix operation of a correlation matrix, can apply to the correlation matrix Ra shown in the formula 15. When the number of sub-carrier signals Nc belonging to the divided band 3 or the number of paths is smaller than the number of array elements, however, since the case can be considered where the number of ranks of the correlation matrix that is the output of the correlation matrix creating unit 22 does not reach the full rank, a beam former method can be considered to be adaptively used together according to the number of ranks or the number of paths. Furthermore, when the configuration of the array antenna 1 is uniform linear array arrangement, the arrival direction estimation processing in a beam space in which a directional vector is put into a real number can be applied in the same manner by multiplying the correlation matrix Ra shown in the formula 15 by the spatial smoothing processing and unitary conversion processing for multiplying the unitary conversion matrix.

Incidentally, sub-carrier transmission may be sub-carrier signals to which the orthogonal frequency division multiplexing (OFDM) is applied. In this case, frequency in which each sub-carrier signal is orthogonal in the OFDM symbol section is selected and used. Also, sub-carrier transmission can be applied to the code division multiplexed MC-CDMA method in the direction of the frequency axis. In this case, the pilot correlation value of each sub-carrier signal for each user is calculated by using the pilot signal embedded in the multiplexed sub-carrier signals for each individual user. Accordingly, the same effect can be obtained by performing the operation explained in the embodiment.

Also, it can be adapted even to the code division multiplexed MC/DS-CDMA method in the direction of the time axis in the same manner. In this case, a user signal that is code division multiplexed in the direction of time axis of each sub-carrier signal is extracted by de-spreading. And then, a pilot correlation value of each sub-carrier signal for each user is calculated. Thus, the same effect can be obtained by performing the operation explained in this embodiment.

Furthermore, when code division multiplexed users exist, the divided band array weight creating unit 5 may be additionally given a beam creating function for reducing interference between users who are code division multiplexed.

4th Exemplary Embodiment

Figure 7:
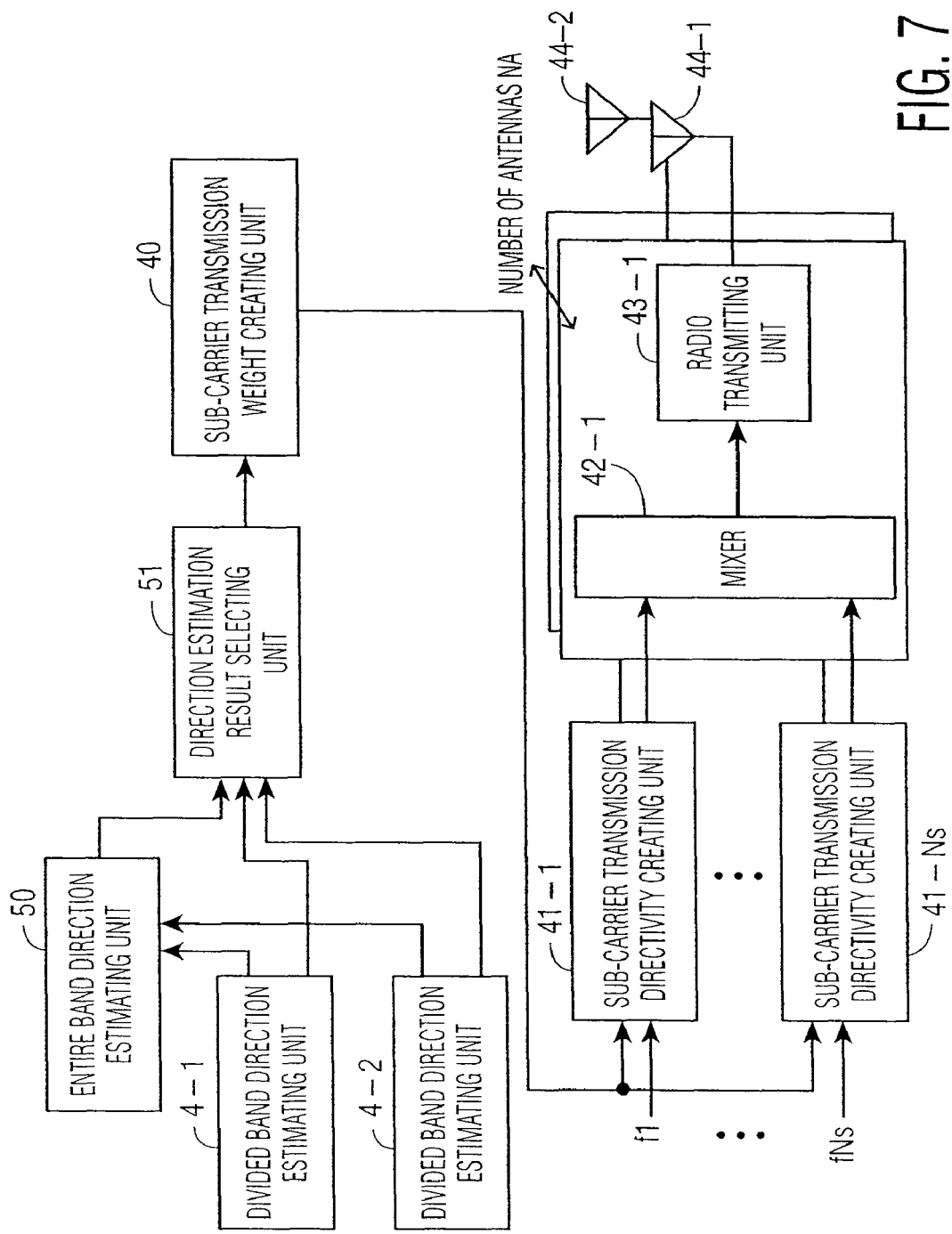
FIG. 7 is a block diagram illustrating a configuration of a radio communication device in a fourth embodiment of the present invention.

FIG. 7 is a block diagram illustrating a configuration of a transmitting unit of an adaptive antenna radio communication device according to Embodiment 4 of the present invention. The configuration of this embodiment, in the configuration of FIG. 5 explained in Embodiment 2, further comprises an entire band direction estimating unit 50 and a direction estimation result selecting unit 51. Incidentally, since a block diagram until the direction estimation result of the divided band direction estimating unit 4 is obtained is the same as that of Embodiment 1, the description is omitted here. The part that is different from Embodiment 1 is mainly described below with reference to FIG. 7. Incidentally, FIG. 7 illustrates an example when the number of antenna elements Na is 2, the number of sub-carriers Ns is 2 and the number of divided bands Nd is 2.

The operation until the divided band direction estimating units 4-1 to 4-Nd estimate the direction-of-arrival in each divided band based on the high frequency signal s1 that is transmitted in the multi-carrier mode received by the array antenna 1 is the same as Embodiment 1, the description is omitted here.

The entire band direction estimating unit 50 operates in the same manner as in Embodiment 3.

The direction estimation result selecting unit 51 selects the estimation value of the entire band direction estimating unit 50 using the angle spread AS that is calculated in the same manner as in Embodiment 3 and outputs it to the sub-carrier transmission weight creating unit 40, when the angle spread AS is smaller than the predetermined value K. On the other hand, when the angle spread As is greater than the predetermined value K, the direction estimation result selecting unit 51 outputs the estimation values of the divided band direction estimating units 4-1 to 4-Nd in each of divided bands 3-1 to 3-Nd to the sub-carrier transmission weight creating unit 40 in the same manner as in Embodiment 2. Herein, m is 1 to Nd.

Furthermore, as a different method for calculating the angle spread AS, the angle spread AS may be obtained from the formula 17 using only the direction estimation value φkm giving the upper spatial profile value (or the direction-of-arrival estimation evaluation function value) Fm(Φkm).

Next, the sub-carrier transmission weight creating unit 40 creates a weight of a transmission array based on the output of the direction estimation result selecting unit 51. The sub-carrier transmission weight creating unit 40 is to input the estimation values of the divided band direction estimating units 4-1 to 4-Nd in each of divided bands 3-1 to 3-Nd, when the angle spread AS is greater than the predetermined value K and to perform the same operation as the sub-carrier transmission weight creating unit 40 in a mode of Embodiment 2. On the other hand, when the angle spread AS is less than the predetermined value, since the sub-carrier transmission weight creating unit 40 is to select and input the estimation value of the entire band direction estimating unit 50, it creates a weight of a transmission array facing toward the main beam in the direction of the direction estimation value.

Then, transmitting data is modulated at a modulator that is not illustrated in a predetermined modulation format and the transmitting sub-carrier signals 41-1 to 41-Ns are created. The sub-carrier transmission directivity creating unit 41-1 to Ns divides the transmitting sub-carrier signals 41-1 to 41-Ns to the number equal to the number of elements of array antenna 1 Na for multiplying each of them by elements in the transmission array weight Ws=[w1, w2, . . . , wna] and outputs it to the mixers 42-1 to 42-Na.

The following operation is the same as that of Embodiment 2.

As described above, according to this embodiment, in addition to the effects of Embodiment 1 and Embodiment 2, directivity formation different with the respective entire divided bands or transmission directivity formation common to all divided bands 3 can be switched in accordance with the angle spread AS. Thus, when the angle spread AS is small, the average direction-of-arrival for all sub-carrier signals can be estimated. For this reason, by frequency selective fading, even when the receiving level of some bands is small, robust direction-of-arrival estimation can be made in the whole communication band. Since the directivity transmission using the result ensures more stabilized operation, multiuser interference can be suppressed and the system capacity can be improved.

Incidentally, in this embodiment, the entire band direction estimating unit 50 performs the direction estimation using sub-carrier signals of the entire communication band. However, a configuration to perform the direction estimation with the number of divisions greater than the number of sub-carrier signal divisions Ns used by the divided band direction estimating unit 4 may be good.

Incidentally, sub-carrier transmission may be sub-carrier signals to which the orthogonal frequency division multiplexing (OFDM) is applied. In this case, frequency in which each sub-carrier is orthogonal in the OFDM symbol section is selected and used. Also, sub-carrier transmission can be applied to the code division spread MC-CDMA mode in the direction of the frequency axis. In this case, the operation explained in this embodiment is performed after user signals are extracted for each code division multiplexed user following de-spreading of spread codes.

Also, code multiplexed MC-DS-CDMA mode in the direction of time axis can be adapted in the same manner. In this case, the operation explained in this embodiment is performed after user signals are extracted for each code division multiplexed user following de-spreading of spread codes.

Furthermore, when code division multiplexed users exist, the sub-carrier transmission weight creating unit 40 may be additionally given a beam creating function for reducing interference between users who are code division multiplexed in the same manner as in Embodiment 1.

INDUSTRIAL APPLICABILITY

As described above, the present invention is useful for an adaptive antenna radio communication device and suitable for multi-carrier transmission.

What is claimed:

1. An adaptive antenna radio communication device comprising:
    a transmission array weight creating unit for generating one transmission array weight for each of a plurality of divided bands to form a transmitting directional beam, said plurality of divided bands are generated by splitting a communication band for multi-carrier transmission and each of the divided bands including a group of sub-carrier signals, wherein each transmission array weight is generated using a plurality of sub-carrier signals which are produced in parallel and which are included in the corresponding group of sub-carrier signals of the respective divided band; and
    a sub-carrier transmission directivity creating unit for generating weighted transmission signals, by multiplying the respective group of sub-carrier signals of each of said divided bands, by said corresponding transmission array weight.

2. An adaptive antenna radio communication device according to claim 1, wherein said transmission array weight creating unit outputs either an array weight common to all communication bands, or an array weight specific to the divided band.

3. An adaptive antenna radio communication method comprising:
    generating one transmission array weight for each of a plurality of divided bands to form a transmitting directional beam, said plurality of divided bands are generated by splitting a communication band for multi-carrier transmission and each of the divided bands including a group of sub-carrier signals, wherein each transmission array weight is generated using a plurality of sub-carrier signals which are produced in parallel and which are included in the corresponding group of sub-carrier signals of the respective divided band; and transmitting weighted transmission signals, obtained by multiplying the respective group of sub-carrier signals of each of said divided bands by said corresponding transmission array weight.

4. An adaptive antenna radio communication method according to claim 3, wherein either an array weight common to all communication bands or an array weight specific to the divided band is used, as the transmission array weight.

5. An adaptive antenna radio communication device according to claim 1, wherein each sub-carrier signal of the plurality of sub-carrier signals has different frequency.

6. An adaptive antenna radio communication method according to claim 3, wherein each sub-carrier signal of the plurality of sub-carrier signals has a different frequency.

* * * * *

UNITED STATES PATENT AND TRADEMARK OFFICE
CERTIFICATE OF CORRECTION

| | | |
|---|---|---|
| PATENT NO. | : 7,940,215 B2 | Page 1 of 1 |
| APPLICATION NO. | : 11/961340 | |
| DATED | : May 10, 2011 | |
| INVENTOR(S) | : Kishigami et al. | |

It is certified that error appears in the above-identified patent and that said Letters Patent is hereby corrected as shown below:

On the Title Page, please insert the following:

Item -- (30)  Foreign Application Priority Data

September 27, 2001   (JP)   2002-283194 --

Signed and Sealed this
Twenty-fifth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,940,215 B2 | Page 1 of 1 |
| APPLICATION NO. | : 11/961340 | |
| DATED | : May 10, 2011 | |
| INVENTOR(S) | : Kishigami et al. | |

It is certified that error appears in the above-identified patent and that said Letters Patent is hereby corrected as shown below:

On the Title Page, please insert the following:

Item -- (30)   Foreign Application Priority Data

September 27, 2002   (JP)   2002-283194 --

This certificate supersedes the Certificate of Correction issued October 25, 2011.

Signed and Sealed this
Third Day of April, 2012

David J. Kappos
*Director of the United States Patent and Trademark Office*